United States Patent [19]
Colegrove et al.

[11] Patent Number: 6,096,669
[45] Date of Patent: Aug. 1, 2000

[54] UNIDIRECTIONAL FIBER-RANDOM MAT PREFORM

[75] Inventors: Brenda T. Colegrove; Warren D. White, both of Lake Jackson, Tex.; Johnny P. Gendreau, Beacon Falls, Conn.; Larry N. Varholak, Southbury, Conn.; Curt G. Wilkinson, Wallingford, Conn.

[73] Assignees: GKN Westland Aerospace Inc., Wallingford, Conn.; DOW Chemical Co., Midland, Mich.

[21] Appl. No.: 08/959,455

[22] Filed: Oct. 28, 1997

[51] Int. Cl.[7] .............................. D04H 1/74; B32B 5/26; B32B 27/12; B32B 31/04

[52] U.S. Cl. .................... 442/366; 442/367; 442/368; 442/381; 442/391; 442/394; 442/395; 428/542.8; 264/136; 264/258

[58] Field of Search ...................... 428/137, 138, 428/542.8; 264/136, 258; 442/366, 367, 368, 381, 391, 394, 395

[56] References Cited

FOREIGN PATENT DOCUMENTS

| 0 500 990 | 9/1992 | European Pat. Off. . |
|---|---|---|
| 195 34 627 | 3/1997 | Germany . |
| WO 95/32085 | 11/1995 | WIPO . |

OTHER PUBLICATIONS

Abstract of Japanese Patent No. 07238452.

*Primary Examiner*—Terrel Morris
*Assistant Examiner*—Cheryl Juska
*Attorney, Agent, or Firm*—William J. Sapone, Esq.; Nims, Howes, Collison, Hansen & Lackert

[57] ABSTRACT

A preform suitable for use in a resin transfer molding process comprising (1) one or more layers of a non-woven random mat and (2) one or more layers of a series of tows of unidirectional fibers held together by a polymeric curable resin film grid. The polymeric resin film is in the form of a grid, such that only a fraction of the surface area of the fibers contacts the resin film.

16 Claims, 3 Drawing Sheets

UNIDIRECTIONAL FIBER-RANDOM MAT PREFORM

BACKGROUND OF THE INVENTION

This invention relates to preforms for molding processes, especially resin transfer molding processes and to methods for preparing the preforms.

Preforms for resin transfer molding (RTM) are typically composed of layers of oriented fiber material which are assembled and shaped prior to insertion into a mold for resin injection. Resin is then injected into the mold to infiltrate between the fibers to fill out the composite part. This process for producing composite parts is known as "resin transfer molding" (RTM).

In such a process, it is difficult to incorporate a layer of unidirectional fibers, because there is no way to maintain dry unidirectional fibers in register during preform assembly. It is also difficult to place the fibers in a preform because of the tendency of the fibers to separate. Even if one were to successfully place a layer of dry unidirectional fibers in the preform, it is likely that during resin injection, the fibers will separate and shift, thus reducing part strength, and making it difficult to maintain part to part consistency.

To overcome this problem, a preimpregnated unidirectional fiber preform was used which has a resin content of about 35 percent by weight. While sufficient to hold the fibers together, this preform failed to allow impregnation of the preform with matrix resin during the molding process. On the other hand, a unidirectional fiber perform having a low resin content (3 to 5 percent by weight), such as that described in U.S. Pat. No. 5,496,602, was found to be difficult to handle, resulting in fiber breakage.

Dry fiber preforms, in which the unidirectional fibers are either stitched together or held together by a small fraction of transverse fibers, are an alternative to preimpregnated fiber preforms. However, stitching reduces the toughness of the composite and the dry fibers can be difficult to wet out.

It would be desirable to provide a unidirectional fiber preform having a resin content which is sufficient to hold the fibers in the desired shape and position but small enough to leave the resulting preform porous so that it can be impregnated with matrix resin during subsequent molding processes. Additionally, it would be desirable to provide a unidirectional fiber preform having improved permeability with respect to the RTM resin to reduce injection time and improve fiber wet out.

SUMMARY OF THE INVENTION

In a first aspect, the present invention is a preform suitable for use in a resin transfer molding process comprising (1) one or more layers of a non-woven random mat made of chopped fibers and (2) one or more layers of a series of tows of unidirectional fibers held together by a film of polymeric curable resin. The polymeric curable resin film is in the form of a grid, such that only a fraction of the surface area of the fibers contacts the polymeric curable resin film. Preferably, the polymeric curable resin film grid is formed in the shape of a diamond pattern. Other patterns, such as square, rectangle, triangle, circle, ellipse and the like can be used. The resin film grid is present on one or both sides of the unidirectional carbon fibers.

In a second aspect, the present invention is a process for preparing a preform which comprises (1) providing a resin film grid, (2) forming a resin-fiber tape by applying a layer of the resin film grid on at least one side of a plurality of unidirectionally aligned carbon fibers in an amount sufficient to hold the fibers in the desired shape and position, but small enough to leave the resulting preform porous so that it can be impregnated with matrix resin during subsequent molding processes, (3) heating the resin-fiber tape to melt the resin on the fibers and (4) adhering a non-woven random mat to one or both sides of the resin-fiber tape using heat and pressure.

The process and the preform of the present invention can be used to make reinforced matrix composites. The composites are useful as structural materials.

DETAILED DESCRIPTION OF THE INVENTION

Figure 1:
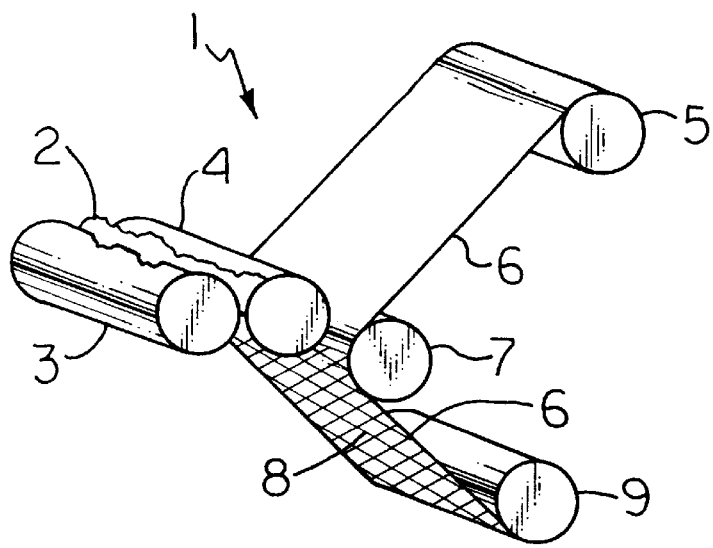
FIG. 1 is a perspective view showing the preparation of a diamond-shaped resin film grid on a release paper.

Referring now to FIG. 1, resin 2, preheated in an oven to obtain a melt, is fed between a preheated stationary roller 3 and a preheated rotating roller 4 of a resin printing apparatus generally shown as 1. The temperature to which both rollers are preheated depends on the resin, and is chosen to achieve optimal resin viscosity for the resin printing process, which is about 10,000 cps. For example, if the resin used is Cytec™ 5250-4 RTM (defined hereinafter), the rollers are preheated to 66° C.

Figure 6:
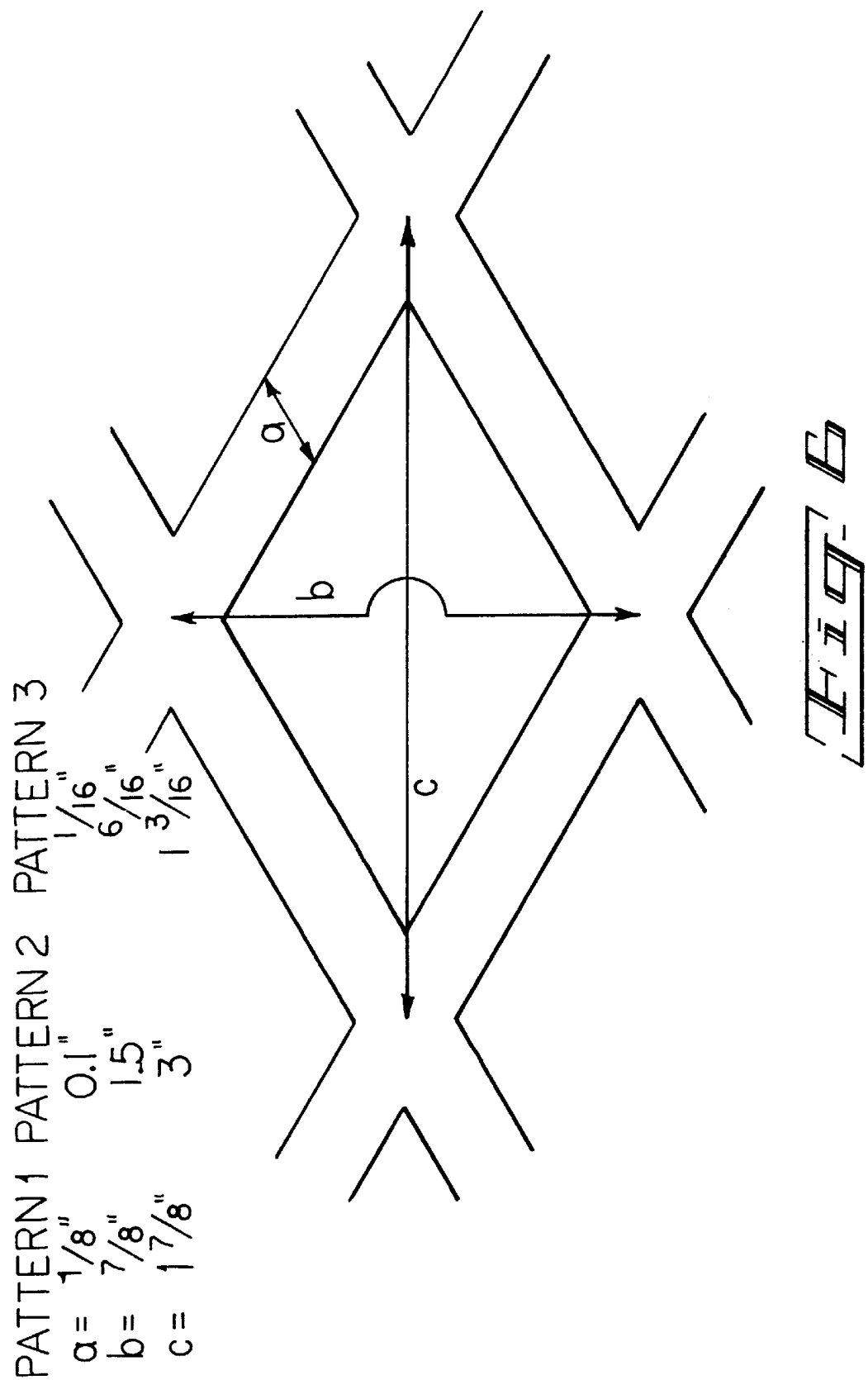
FIG. 6 shows the diamond dimensions of the rubber imprint roller used in forming a diamond film grid on a release paper.

Release paper 6 from paper inlet roller 5 is fed through the nip of imprint roller 7 and rotating roller 4 by rotating the paper inlet roller 5, the imprint roller 7, and the paper take-up roller 9. Imprint roller 7 is provided with raised diamond patterns, or other patterns, such as square, rectangle, triangle, circle, ellipse and the like. The gap between imprint roller 7 and rotating roller 4 is adjusted to provide sufficient pressure to effect the transfer of the resin melt from rotating roller 4 to the portions of release paper 6 which are pressed against rotating roller 4 and the raised diamond patterns, forming a layer of diamond patterned resin film grid 8 on release paper 6. Film grid 8 on release paper 6 is rolled onto take-up roller 9. The weight of the resin film grid is controlled by adjusting the speed of the rotating rollers, the temperature of the heated rollers, and the gap between rollers 4 and 7. Dimensions of the diamond pattern are shown in FIG. 6.

The choice of resin for the resin film grid depends on the desired properties of the intended application. The resin should be compatible with the RTM resin used ultimately to manufacture a resin transfer molded part. The resin may be a mixture of resins similar in backbone structure but differing in molecular weight in order to achieve a viscosity desirable for printing the resin mesh film onto paper. Lower viscosity of the resin contributes to obtaining a lower resin film weight.

Resins which can be employed in the practice of the present invention for preparing the resin film grid include epoxy resins, and mixtures of epoxy resins and curing agents; polyamides, such as bismaleimide resins; polycyanate ester resins; vinyl ester resins; and benzocyclobutene. Such resins are described in U.S. Pat. Nos. 4,992,228; 5,080,851; 5,427,725 and 5,427,726, the relevant portions of which are incorporated herein by reference. Another suitable resin is 1,1'-MDA bismaleimide (BMI) resin, known within the industry as Cytec™ 5250-4RTM BMI resin manufactured by Cytec Chemical Company.

Epoxy resins which can be employed in the practice of the present invention are the diglycidyl ethers of bisphenols, hydrocarbyl-substituted biphenol, hydrocarbyl-substituted bisphenol, phenol or hydrocarbyl-substituted bisphenol-aldehyde novolac resins, unsaturated hydrocarbon-phenol or hydrocarbyl-substituted phenol resins or combinations thereof.

Vinyl ester resins which can be employed in the practice of the present invention are the acrylates or methacrylates of polyglycidyl ethers of compounds having an average of more than one phenolic hydroxyl group per molecule.

Mixtures of epoxy resins and curing agents which can be employed in the practice of the present invention include (a) a mixture of D.E.N. 438 epoxy resin manufactured by The Dow Chemical Company and a known curing agent such as diamino diphenyl sulfone; (b) a mixture of polyisocyanate and polyol suitable to make polyurethanes, such as SPEC-TRIM® MM310; (c) epoxy-cyanate ester resin systems, such as E-905L resin from BP Chemicals; and (d) PR500 manufactured by 3M.

D.E.N. 438 is an epoxy novolac resin having a viscosity of 20,000 to 50,000 cps at 25° C. and an epoxy equivalent weight of 176 to 181. PR500 resin is a fluorene-containing resin containing both epoxy and amine functionality, so that it cures without a separate curing agent. It has a viscosity of 110 cps at 155° C. Preferably, if PR500 is used, it may be blended with another resin such as PT500 epoxy resin also manufactured by 3M. PT500 epoxy resin is a powdered tackifier having a viscosity of $2 \times 10^6$ cps at 65° C. and is compatible with PR500. The PT500 resin assists in adjusting the adhesiveness of the resin film and can be varied according to need.

The resin content of the preform must be sufficient to hold the fibers in the desired shape and position but small enough to leave the resulting preform porous so that it can be impregnated with matrix resin during subsequent molding processes. In general, the resin content of the preform is from about 2 to about 30 weight percent, based on the total weight of the fiber and resin. Preferably, the resin content of the preform is from about 6 to about 12 weight percent and, most preferably, about 8 weight percent, based on the total weight of the fiber and resin.

Suitable materials for use as release papers or films are commercially available, such as, for example, Mylar™, a polyester film manufactured by 3M Company.

Imprint roller 7 can be made of natural or synthetic rubber, polyurethane or other synthetic elastomers. Imprint roller 7 can also be made of metal engraved with a grid pattern.

Figure 2:
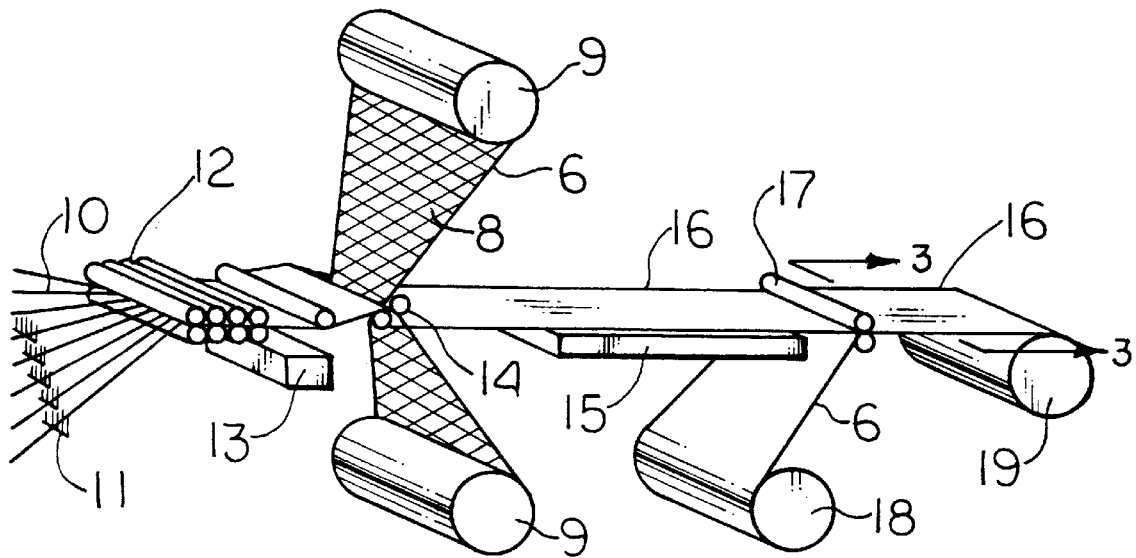
FIG. 2 is a perspective view showing the preparation of a unidirectional fiber tape.

Referring now to FIG. 2, a plurality of tows of unidirectional fibers 10 are passed through comb 11 to align the fibers, and through two rows of shaker rollers 12. The two rollers on each end of the rows are vibrated in a direction perpendicular to the fiber direction to improve fiber alignment and tow integration. The fibers are preheated by passing them through heat lamp 13 before they are fed through a pair of heated rollers 14 where they are sandwiched between two layers of resin film grid 8 on release paper 6 passing simultaneously through the pair of rollers 14. Rollers 14 are heated to a temperature sufficient to melt the resin, which is typically from about 60 to about 121° C. For example, if the resin used is Cytec™ 5250-4RTM, the rollers are preheated to 66° C.

Figure 3:
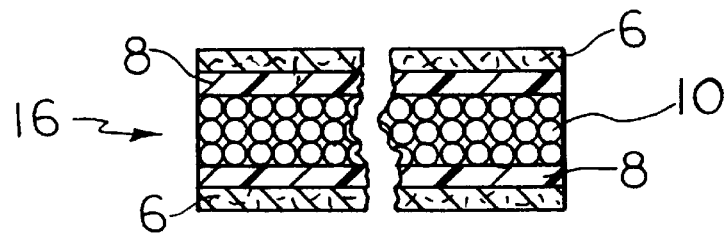
FIG. 3 is a view taken along 2—2 of FIG. 2 showing the unidirectional fiber tape.

The gap between the pair of rollers 14 is adjusted to provide sufficient pressure for the layers of resin film grid 8 (softened by the heated rollers) to be transferred to both sides of the unidirectionally aligned fibers 10. The unidirectionally aligned fibers 10, with resin film grid 8 on both sides, are then passed over a heated platen 15 (heated to the same temperature as rollers 14), to melt the resin on the fibers, resulting in unidirectional fiber tape 16. As shown in FIG. 3, unidirectional fiber tape 16 comprises unidirectional fibers 10 covered on both sides with resin film grid 8 on release paper 6. Unidirectional fiber tape 16 is then passed through nip rollers 17 where bottom release paper 6 is removed and subsequently rolled onto take-up roller 18. Unidirectional fiber tape 16, with top release paper 6, is rolled onto take-up roller 19.

The term "tow" as used herein, refers to a loose, untwisted rope of fibers which may include fibers of carbon, graphite, glass, aramid, quartz, boron, silicon carbide, or other fibers for use in reinforcement of plastic composite parts.

For the purposes of the present invention, the term "tow" will include yarns which are multiple tows. Generally, from 3,000 to 50,000 fibers may be incorporated in a single tow.

Figure 4:
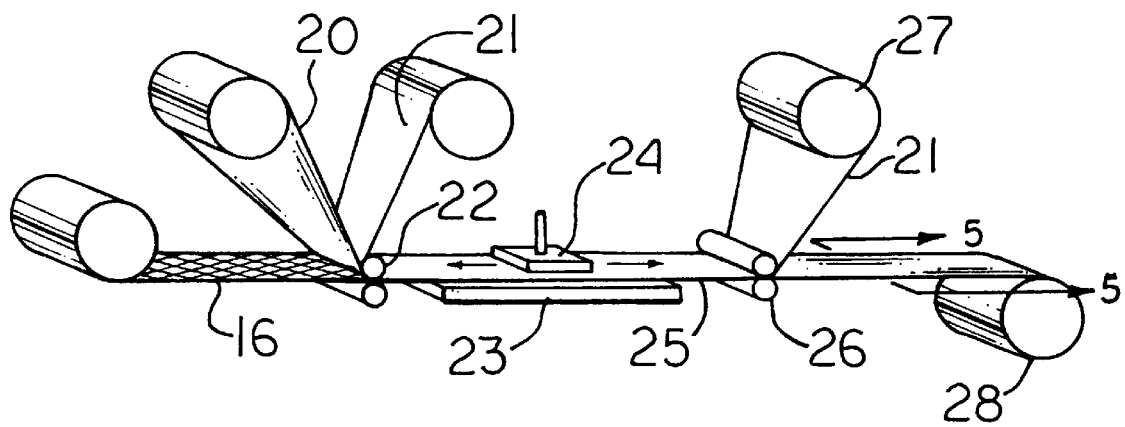
FIG. 4 is a perspective view showing the preparation of the preform of the present invention.
Figure 5:
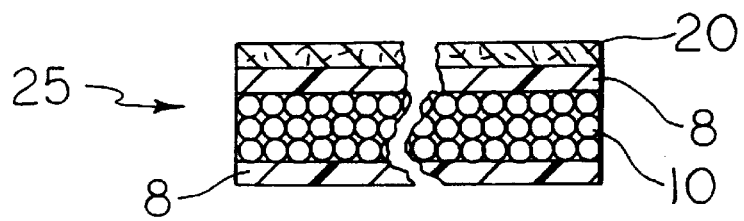
FIG. 5 is a view taken along 4—4 of FIG. 4 showing the combination of a top release paper, carbon paper, diamond-shaped resin film grid and bottom release paper.

Referring to FIG. 4, unidirectional fiber tape 16 (with release paper 6), non-woven random mat 20 and release paper 21 are simultaneously fed through nip rollers 22 such that non-woven random mat 20 is on top of unidirectional fiber tape 16, and release paper 21 is on top of non-woven random mat 20. The assembly of release paper 6, unidirectional fiber tape 16, non-woven random mat 20 and release paper 21, is then passed between platen 23 (heated to the same temperature as rollers 14) and pressure sled 24. Pressure sled 24 moves back and forth along the fiber direction. Heat from heated platen 23 and pressure from sled 24 cause non-woven random mat 20 to adhere to unidirectional fiber tape 16. The resulting preform 25 is passed through a pair of rollers 26 where release paper 21 is separated from non-woven random mat 20 and then rolled onto take-up roller 27. Preform 25 is then rolled onto take-up roller 28. As shown in FIG. 5, preform 25 comprises a first layer of non-woven random mat 20, a second layer of resin film grid 8, a third layer of unidirectional fibers 10, and a fourth layer of resin film grid 8.

The non-woven random mat is formed of chopped fibers held together by a binder. Suitable fibers include fibers of carbon, graphite, glass, aramid, quartz, boron, silicon carbide, or other fibers for use in reinforcement of plastic composite parts. Suitable binders are those resins which are compatible with the resin used ultimately to manufacture a resin transfer molded part, such as the aqueous tackifier dispersions described in U.S. Pat. Nos. 5,480,603 and 5,593,758, both of which are incorporated herein by reference. Other suitable binders are the resins described previously for preparing the resin film grid.

Representative examples of such binders include polyvinyl alcohol or an aqueous dispersion of an epoxy resin, a vinyl ester resin, unsaturated polyester resin, polycyanate ester resin, benzocyclobutene resin, polyimide, bismaleimide, or mixtures thereof.

Preferably, the epoxy resin is a diglycidyl ether of biphenol, bisphenol, hydrocarbyl-substituted biphenol, hydrocarbyl-substituted bisphenol, phenol- or hydrocarbyl-substituted bisphenol-aldehyde novolac resin, unsaturated hydrocarbon-phenol or hydrocarbyl-substituted phenol resin. More preferably, the epoxy resin is a diglycidyl ether of Bisphenol A having an epoxide equivalent weight of from about 650 to about 750.

Preferably, the vinyl ester resin is the reaction product of bisphenol A and acrylic acid and having a number average molecular weight of from about 950 to about 1250.

Preferably, the unsaturated polyester resin is the reaction product of fumaric acid and propoxylated or ethoxylated bisphenol A, the reaction product of maleic anhydride and ethoxylated or propoxylated bisphenol A, or the pentaerythritol ester of tall oil resin.

Preferably, the bismaleimide resin is 4,4'-bismaleimidodiphenylmethane or 1,4-bismaleimido-2-methylbenzene, a modified bismaleimide containing Diels-Alder comonomers, a partially advanced modified bismaleimide containing Diels-Alder comonomers, or a partially advanced bismaleimide based on 4,4'-bismaleimidodiphenylmethane and allylphenyl compounds or aromatic amines.

Preferably, the non-woven random mat is as light weight as possible while still maintaining enough mechanical integrity to be handled without ripping or deforming so as to maintain the properties of the tape as unidirectional as possible.

The preforms of the present invention are useful in preparing fiber-reinforced composites by well known molding processes, such as resin transfer molding. Resin transfer molding is described, for example, in Plastics Engineering Handbook of the Society of the Plastics Industry, Inc. Fourth Edition, pp. 220–229. The fiber-reinforced composites and shaped articles containing them are useful for structural materials and parts.

Fiber-reinforced composites are well known in the art and are described, for example, in Kirk-Othmer Ency. Chem., Tech.—Supp., Composites, High Performance, pp. 260–281 (J. Wiley & Sons 1984). A composite typically comprises a plurality of fibers (reinforcement fibers) embedded in a plastic (the matrix). Typically, the fibers give strength and/or stiffness to the composite, and the matrix maintains fiber orientations and spacings, transmits shear loads between layers of fibers so that they resist bending and compression and protects the fiber from surface damage.

Individual plies of preform may optionally be shaped or laminated together (a thermoforming step) after the tackifier is applied to the reinforcement fibers. For instance, multiple plies may be pressed together at a temperature above the glass transition melting or softening temperature of the tackifier. Likewise, individual preforms or laminates may be molded or shaped at a temperature that is above the glass transition melting or softening temperature of the tackifier. Examples of shaping and laminating different preforms are described in U.S. Pat. Nos. 4,992,228 and 5,080,851.

The following working examples are given to illustrate the invention and should not be construed to limit its scope. Unless otherwise indicated, all parts and percentages are by weight.

EXAMPLE 1

A preform is made in accordance with the procedure described above, using the following materials:

Resin—A mixture of 75% 3M PR500 epoxy resin and 25% 3M PT500 epoxy resin

Fiber—12 K IM7 carbon fiber, a type of carbon fiber produced by Hercules. The term "12K" denotes 12 K tow (i.e., 12,000 fibers per tow).

Carbon paper—A non-woven carbon paper produced by Technical Fiber Products and made from chopped 12K IM7 carbon fiber and EpiRez 5003 as binder, using procedures standard in the industry. EpiRez 5003 is a non-ionic aqueous dispersion of a polyfunctional aromatic epoxy resin available from Shell Company.

The preform has an areal weight of 354.8 $g/m^2$ (10 $g/m^2$ carbon paper, 307.7 $g/m^2$ unidirectional carbon fiber, 37.1 $g/m^2$ resin).

Physical property testing

A composite panel is made by the resin transfer molding (RTM) process using the preform prepared above and PR500 as the injected resin. Specimens cut from the panel are tested for tensile modulus and tensile strength (ASTM D3039 Poisson's ratio). Following normalization to 59% fiber volume, the mean tensile modulus and the mean tensile strength are found to be 21.8 Msi and 313 Ksi, respectively.

EXAMPLE 2

The procedure of Example 1 is followed to make a preform, except that the resin used to make the preform and as the injection resin is Cytec 5250-4RTM. Composition of the preform is 10 $g/m^2$ carbon paper, 308.7 $g/m^2$ unidirectional carbon fiber, 36.6 $g/m^2$ resin (total areal weight 355.3 $g/m^2$). The preform resulting after sandwiching the carbon fibers between layers of the resin film grid has good mechanical integrity in the direction transverse to the carbon fibers, i.e. the fibers could not be separated by gentle pulling.

EXAMPLE 3

The procedure of Example 2 is followed, except that the dimensions of the diamond pattern on roller 6 of FIG. 1 are increased, as shown in FIG. 6, Pattern 2. The preform resulting after sandwiching the carbon fibers between layers of the resin film grid has inferior mechanical integrity in the direction transverse to the carbon fibers, i.e. the fibers could easily be separated by gentle pulling.

The composition of the preform is 10 $gm/m^2$ carbon mat, 301.8 g/m2 unidirectional fiber, 37.4 $g/m^2$ resin (total areal weight 340.2 $g/m^2$).

EXAMPLE 4

The procedure of Example 2 is followed, except that the carbon paper has polyvinyl alcohol as the binder, and the dimensions of the diamond pattern on roller 6 of FIG. 1 are decreased, as shown in FIG. 6, Pattern 3. The preform resulting after sandwiching the carbon fibers between layers of the resin film grid is stiffer than in Example 2 and could not be easily formed around a contoured surface.

EXAMPLE 5

The procedure of Example 1 is followed, except that the carbon paper is made using polyvinyl alcohol as binder.

EXAMPLE 6

The procedure of Example 5 is followed, except that the resin used to make the preform is a resin composition comprising 2.2 weight percent D.E.R.™ 332, 40.3 weight percent Tactix™ 556, 25.8 weight percent D.E.R. 542 (all manufactured by The Dow Chemical Company) and 31.7 weight percent CRJ-406. D.E.R. 332 is a bisphenol A type liquid epoxy resin with epoxy equivalent weight of 172 to 176 and a viscosity of 4000 to 6000 cps at 25C. D.E.R. 542 is a semi-solid brominated epoxy resin with an epoxide equivalent weight of 305 to 355. Tactix 556 is a dicyclopentadiene epoxy novolac resin with an epoxy equivalent weight of 215 to 235. CRJ-406 is a cresol novolac resin available from Schenectady.

EXAMPLE 7

The procedure of Example 1 is followed, except that the carbon paper is made using an aqueous dispersion of 3M PR500 (40% by weight) as the binder.

EXAMPLE 8

The procedure of Example 2 is followed, except that the carbon paper is made using an aqueous dispersion of Cytec 5250-4RTM (40% by weight) as the binder.

What is claimed:

1. A preform suitable for use in a resin transfer molding process comprising (1) at least one layer of a non-woven random mat and (2) at least one layer of a series of tows of unidirectional fibers held together by a polymeric curable resin film grid presented on at least one side of the unidirectional fibers in an amount sufficient to hold the fibers in the desired shape and position but small enough to leave the resulting preform porous so that the preform can be impregnated with matrix resin during subsequent molding processes.

2. The preform of claim 1 wherein the polymeric curable resin is a polyamide, a polycyanate ester resin, a vinyl ester resin, an epoxy or a benzocyclobutene resin.

3. The preform of claim 1 wherein the unidirectional fibers are fibers of glass, carbon, graphite, aramid, ceramic, quartz, boron or silicon carbide.

4. The preform of claim 1 wherein the non-woven random mat is formed of chopped fibers of glass, carbon, graphite, aramid or ceramic, held together by a binder.

5. The preform of claim 4 wherein the binder is polyvinyl alcohol or an aqueous dispersion of an epoxy resin, a vinyl ester resin, unsaturated polyester resin, polycyanate ester resin, benzocyclobutene resin, polyimide, bismaleimide, or mixtures thereof.

6. The preform of claim 5 wherein the epoxy resin is a diglycidyl ether of biphenol, bisphenol, hydrocarbyl-substituted biphenol, hydrocarbyl-substituted bisphenol, phenol- or hydrocarbyl-substituted bisphenol-aldehyde novolac resin, unsaturated hydrocarbon-phenol or hydrocarbyl-substituted phenol resin.

7. The preform of claim 6 wherein the epoxy resin is a diglycidyl ether of Bisphenol A having an epoxide equivalent weight of from about 650 to about 750.

8. The preform of claim 5 wherein the vinyl ester resin is the reaction product of bisphenol A and acrylic acid and having a number average molecular weight of from about 950 to about 1250.

9. The preform of claim 5 wherein the unsaturated polyester resin is the reaction product of fumaric acid and propoxylated or ethoxylated bisphenol A, the reaction product of maleic anhydride and ethoxylated or propoxylated bisphenol A, or the pentaerythritol ester of tall oil resin.

10. The preform of claim 5 wherein the bismaleimide resin is 4,4'-bismaleimidodiphenylmethane or 1,4-bismaleimido-2-methylbenzene, a modified bismaleimide containing Diels-Alder comonomers, a partially advanced modified bismaleimide containing Diels-Alder comonomers, or a partially advanced bismaleimide based on 4,4'-bismaleimidodiphenylmethane and allylphenyl compounds or aromatic amines.

11. The preform of claim 1 wherein the polymeric curable resin content of the preform is from about 2 to about 30 weight percent.

12. A single-ply preform suitable for use in a resin transfer molding process comprising a first layer of a non-woven random mat and a second layer of a series of tows of unidirectional fibers held together by a polymeric curable resin film grid.

13. The preform of claim 12 further comprising a third layer of a non-woven random mat.

14. A two-ply preform suitable for use in a resin transfer molding process, each ply comprising a layer of a non-woven random mat and a layer of a series of tows of unidirectional fibers held together by a polymeric curable resin film grid, the layer of unidirectional fibers of one-ply laminated to the layer of non-woven random mat of the other ply.

15. A process for preparing a preform which comprises (1) providing a resin film grid, (2) forming a resin-fiber tape by applying a layer of the resin film grid on at least one side of a plurality of unidirectionally aligned fibers in an amount sufficient to hold the fibers in the desired shape and position but small enough to leave the resulting preform porous so that the preform can be impregnated with matrix resin during subsequent molding processes, (3) heating the resin-fiber tape to melt the resin on the fibers and (4) adhering a non-woven random mat to one side of the resin-fiber tape using heat and pressure.

16. A preform for use in a resin transfer molding process, the preform comprising a plurality of layers of oriented fiber material assembled and shaped prior to insertion into a mold, the preform additionally containing one or more unidirectional fiber layers, each unidirectional fiber layer having a series of tows of unidirectional fibers held together by polymeric curable resin film grid present on at least one side of the unidirectional fibers in an amount sufficient to hold the fibers in a desired shape and position but small enough to leave the resulting preform porous so that the preform can be impregnated with a matrix resin during the resin transfer molding process, at least one layer of a non-woven random mat adhered to at least one side of at least one unidirectional fiber layer.

* * * * *